(12) United States Patent
Gosinski et al.

(10) Patent No.: US 11,741,686 B2
(45) Date of Patent: Aug. 29, 2023

(54) SYSTEM AND METHOD FOR PROCESSING FACILITY IMAGE DATA

(71) Applicant: Raytheon Company, Waltham, MA (US)

(72) Inventors: Toni L. Gosinski, Tucson, AZ (US); Kathy M. Sonderer, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 329 days.

(21) Appl. No.: 17/108,700

(22) Filed: Dec. 1, 2020

(65) Prior Publication Data

US 2022/0171982 A1    Jun. 2, 2022

(51) Int. Cl.
| | |
|---|---|
| *G06V 10/44* | (2022.01) |
| *G06F 16/58* | (2019.01) |
| *G06F 16/583* | (2019.01) |
| *G06N 20/00* | (2019.01) |
| *G06T 7/00* | (2017.01) |
| *G06F 16/51* | (2019.01) |
| *G06F 18/214* | (2023.01) |

(52) U.S. Cl.
CPC ............ *G06V 10/443* (2022.01); *G06F 16/51* (2019.01); *G06F 16/583* (2019.01); *G06F 16/5866* (2019.01); *G06F 18/214* (2023.01); *G06N 20/00* (2019.01); *G06T 7/0002* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 8,940,690 | B2 | 1/2015 | Zion et al. |
| 8,949,233 | B2 | 2/2015 | Hsiao et al. |
| 9,745,635 | B2 | 8/2017 | Tomlins et al. |
| 9,782,417 | B2 | 10/2017 | Rubin et al. |
| 10,341,419 | B2 | 7/2019 | Kidambi et al. |
| 10,450,348 | B2 | 10/2019 | Otterlei et al. |
| 10,517,923 | B2 | 12/2019 | Otterlei |
| 10,819,772 | B2 | 10/2020 | Kidambi et al. |
| 11,270,164 | B1 * | 3/2022 | Nagasamy ........... G06V 10/776 |
| 2014/0024681 | A1 | 1/2014 | Gilmer et al. |

(Continued)

FOREIGN PATENT DOCUMENTS

| | | |
|---|---|---|
| WO | WO-2006084131 A2 | 8/2006 |
| WO | WO-2009134755 A2 | 11/2009 |

(Continued)

*Primary Examiner* — Leon Viet Q Nguyen
(74) *Attorney, Agent, or Firm* — Schwegman Lundberg & Woessner, P.A.

(57) ABSTRACT

A system receives an image relating to an industrial process or a business process, and extracts meta data from the image. The system further receives work order data relating to the industrial process or business process. The image is processed via a machine learning algorithm. The image meta data is used to match the image with the work order data, and the output from the processing of the image via the machine learning algorithm is analyzed. The results of the analysis are displayed on a computer display device, and a recommendation for addressing an issue or a problem associated with the work order data is provided. In another embodiment, quality data are also used in addition to the work order data.

19 Claims, 5 Drawing Sheets

(56) References Cited

U.S. PATENT DOCUMENTS

| | | | |
|---|---|---|---|
| 2016/0267641 A1* | 9/2016 | Gattu | G06V 10/462 |
| 2016/0279193 A1 | 9/2016 | Otterlei | |
| 2016/0289272 A1 | 10/2016 | Otterlei et al. | |
| 2018/0041567 A1 | 2/2018 | Kidambi et al. | |
| 2019/0067057 A1* | 2/2019 | Hu | H01L 21/6773 |
| 2019/0342368 A1 | 11/2019 | Kidambi et al. | |
| 2019/0365777 A1 | 12/2019 | Rubin et al. | |
| 2020/0095286 A1 | 3/2020 | Otterlei et al. | |
| 2020/0286580 A1 | 9/2020 | Chait et al. | |
| 2020/0323953 A1 | 10/2020 | Otterlei | |
| 2020/0327651 A1* | 10/2020 | Srivastava | G06T 7/0004 |
| 2021/0049754 A1* | 2/2021 | Ortega | B25J 9/1669 |
| 2022/0067454 A1* | 3/2022 | Gupta | G06K 9/6269 |
| 2022/0172335 A1* | 6/2022 | Mian | G01N 21/8806 |

FOREIGN PATENT DOCUMENTS

| | | |
|---|---|---|
| WO | WO-2016177898 A1 | 11/2016 |
| WO | WO-2016177898 A9 | 12/2016 |
| WO | WO-2017184586 A1 | 10/2017 |
| WO | WO-2018029702 A1 | 2/2018 |
| WO | WO-2019086390 A1 | 5/2019 |
| WO | WO-2019145953 A1 | 8/2019 |
| WO | WO-2020163381 A1 | 8/2020 |

\* cited by examiner

SYSTEM AND METHOD FOR PROCESSING FACILITY IMAGE DATA

TECHNICAL FIELD

Embodiments described herein generally relate to the processing of facility image data, and in an embodiment, but not by way of limitation, processing, comparing, and analyzing facility image data, facility image meta data, facility work order data, and facility quality data.

BACKGROUND

There are existing systems for analyzing the processes and logistics of industrial and business facilities. For example, an Automated Optical Inspection (AOI) system can be used in factory and other production environments to detect in real-time assembly and other production issues. While an AOI system provides valuable information in real-time, the large amount of image data generated by AOI systems has not been cataloged and linked to other systems such as a database system. This lack of cataloging and linking prevents an operation group of the factory from gaining insights into recurring assembly and other production issues, and it hampers the operation group's ability to develop corrective actions or to proactively develop solutions to the assembly and other production issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

As noted above, images captured from automated optical inspection (AOI) systems are not being leveraged to gain insights into new and recurring assembly issues, thereby preventing development of corrective and proactive remedies to reduce rework, inspection time, product cost and improve product quality. Therefore, in an embodiment, image meta data are extracted from images, work order and quality notification information are appended to these image meta data, the results of machine learning and shape algorithms are appended to the image meta data, work order data, and quality notification data, and the resulting information and data are saved into an image information data repository. In short, an embodiment involves a method for organizing image meta data including security attributes, linking that image meta data to production order data and quality notification data, and storing the results from machine learning algorithms. The embodiment then executes data analytics across the joined data. These data analytics yield new information and data that can be used to reduce rework, inspection time, and product costs, and can also be used to improve product quality.

More specifically, one or more embodiments of the present disclosure address the problem of the lack of cataloging and linking of an AOI system. This problem is addressed by reading and extracting meta data from industrial production images, and appending to the meta data industrial work order and quality notification information. The resulting combination of the image meta data and work order and notification information is then loaded into a central repository or database, and advanced analytics (via machine learning for example) are applied to the combination in order to highlight recurring assembly and other production issues.

An embodiment of the present disclosure integrates key pieces of information from traditionally siloed data sources to create a digital thread of manufacturing assembly information, and as noted, the embodiment applies advanced analytics in order for an operation group to make informed business decisions. While metadata libraries exist in business and industry, these libraries only catalog the metadata from the image and do not integrate other information. In contrast, an embodiment integrates AOI image meta data with work order database information to highlight problematic assembly operations and predict future assembly issues. Consequently, a meta data library has been developed, which previously did not exist, and this meta data library enables the ability to easily extract information for deep learning applications and training. The architecture design is flexible and can support the collection of data from other domains outside of manufacturing.

Figure 1:
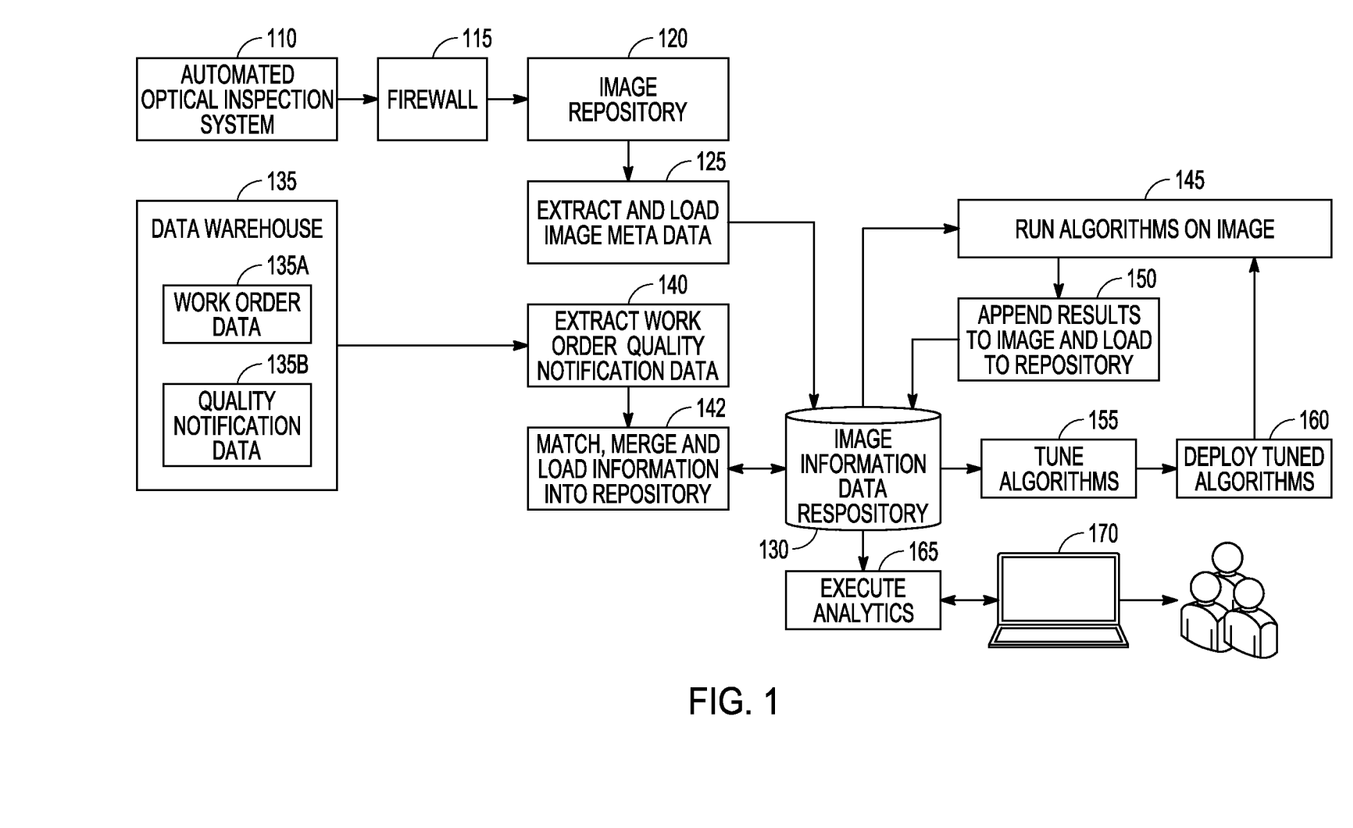
FIG. 1 is a block diagram of an embodiment of a system to process, compare, and analyze facility image data, facility image meta data, facility work order data, and facility quality data.

In a particular embodiment, referring to FIG. 1, an AOI system 110 resides within an industrial or business facility, such as on a factory floor. The AOI system 110 captures image data, and stores these image data, which include image meta data, in a repository or database 120. In an embodiment, the AOI system 110 and the repository 120 are separated by a firewall 115. At 125, image meta data are extracted and loaded into an image information data repository 130.

A data warehouse 135 contains work order confirmation data 135A and quality notification data 135B. While the data warehouse 135 will always contain work order data 135A that are associated with a particular image, the data warehouse 135 will not necessarily include quality notification data 135B for each particular image. That is, in some instances, there will simply not be any quality notification data 135B associated with a particular image because the quality notification data 135B is historical in nature, and there may not be any history associated with a particular image or part (especially if it is a relatively new part in the industrial process).

The order confirmation data and quality notification data can include a part number, a serial number, a location, and a date. As noted, the quality notification data can further include historical quality information about this particular type of part. In an embodiment, another extraction process 140 processes the work order confirmation data 135A and the quality notification data 135B by selecting part numbers and serial numbers that are stored in the data structures 135A and 135B. The selected part numbers and serial numbers are then used to parse the image meta data (encoded in the image file name), and all the information (work order confirmation data 135A, quality notification data 135B, part numbers and serial numbers) is matched and merged at 142 and then stored in the image information data repository 130. Because the image date and time may not exactly match the work order operation date and time, a simple distance measurement can be used to determine the closest information. These data are then appended to the image information stored in the repository 130. In an embodiment, all these data are store in individual columns associated with each type of data. The information is updated as new image information is received from the AOI system.

The data in the image information data repository 130 are processed in machine learning algorithms 145. Additionally, the information is updated as new image information is copied to the image repository 120. As new images are received and processed, the machine learning algorithms 145 (which include shape detection algorithms) are run to analyze the new images for accuracy against known correct images. Scores are produced upon completion of the algorithms and the results appended to image information stored in the image information data repository 130. Advanced analytics involving the machine learning algorithms 145 can be produced to highlight issues, and transmit alerts relating to increases in assembly problems and predictions relating to possible issues in the future.

The output of the machine learning algorithms 145 is appended to the particular image at issue at 150, and stored again in the image information data repository 130. The system further measures and monitors when the machine learning algorithms 145 need to be retrained and/or retuned, and as indicated at 155, the machine learning algorithms are then retrained, and the retrained algorithms can be redeployed at 160. At 165, the output of the machine learning algorithms is analyzed, and the results displayed to operations personnel on a computer display device 170.

Figure 2:
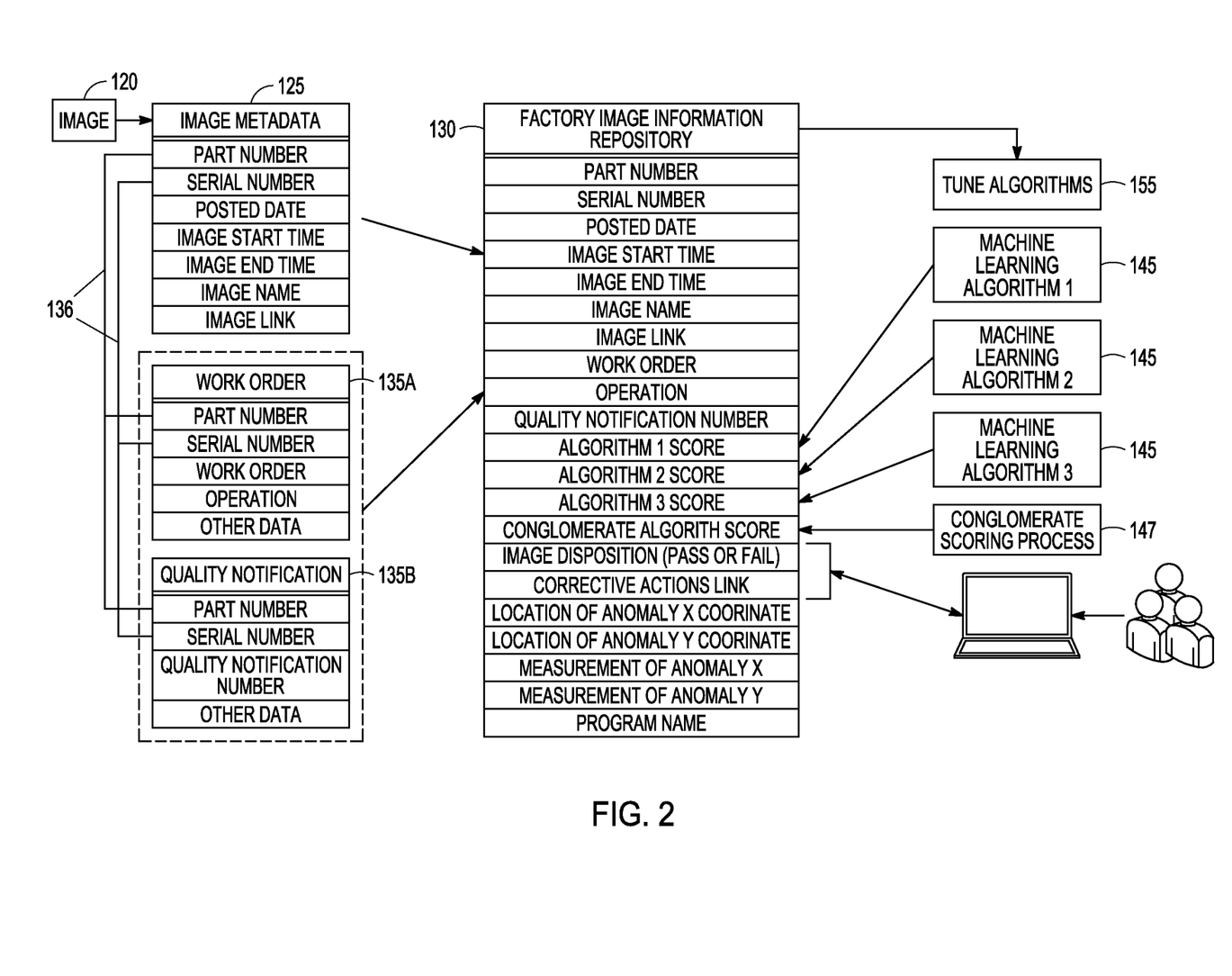
FIG. 2 is a data structure illustrating the relationship among facility image data, facility image meta data, facility work order data, and facility quality data.

FIG. 2 is another diagram of an example embodiment illustrating a relationship among image metadata, work order data, quality notification data, an image information repository, and machine learning algorithms. This relationship can be referred to as a digital thread. Referring to FIG. 2, image metadata 125 can include a part number, a serial number, a date, an image start and stop time, an image name, and a link to the actual image 120. These image metadata are linked at 136 to other data sources, such as the work order data 135A and the quality notification data 135B, via the part number and serial number. These threads can then be linked to the image information data repository 130. As illustrated in FIG. 2, the image information data repository 130 can include the part number, the serial number, the date, the image start and stop time, the image name, and the link to the actual image (from the image metadata 125). The image information data repository 130 further includes the work order and the operation (from the work order data 135A). The image information data repository 130 further includes the quality notification number (from the quality notification data 135B).

As further illustrated in FIG. 2, these data from the image information data repository 130 are provided to one or more machine learning algorithms 145, and individual and/or conglomerate machine algorithm scores are generated at 147. From these one or more scores, it can be decided whether the part or object at issue is good or defective, that is, whether the part or object passes or fails. If it fails, the corrective action link in the image information repository 175 can be accessed to provide a recommendation to an engineer, operator, or other person. Other data can be stored in the image information data repository 130 such as the location on the part of the defect and a measurement of the defect. As previously noted, the one or more machine learning algorithms can be retrained or retuned at 155 whenever the need arises.

Figure 3A:
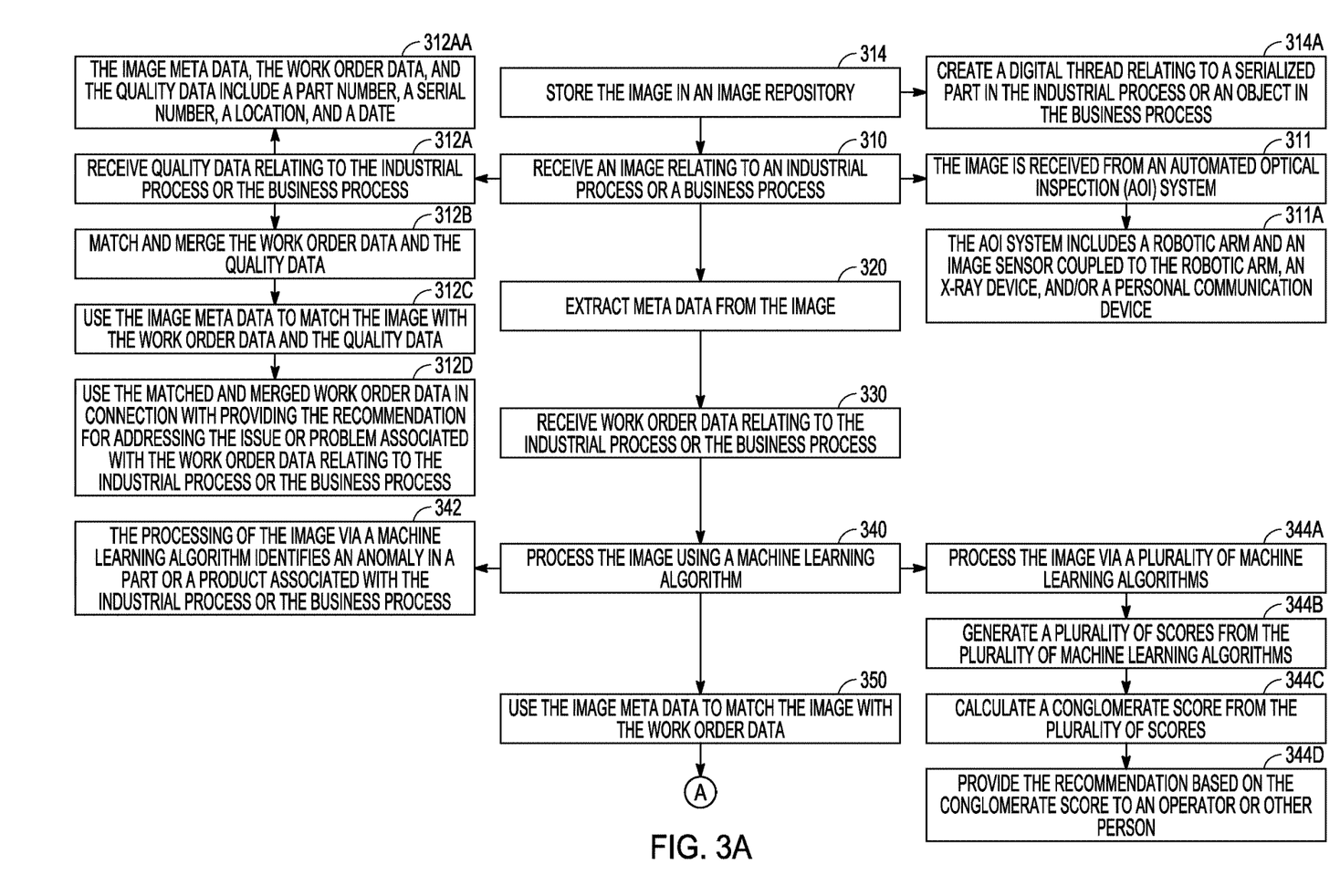
FIGS. 3A and 3B are a block diagram of a process to compare and analyze facility image data, facility image meta data, facility work order data, and facility quality data.
Figure 3B:
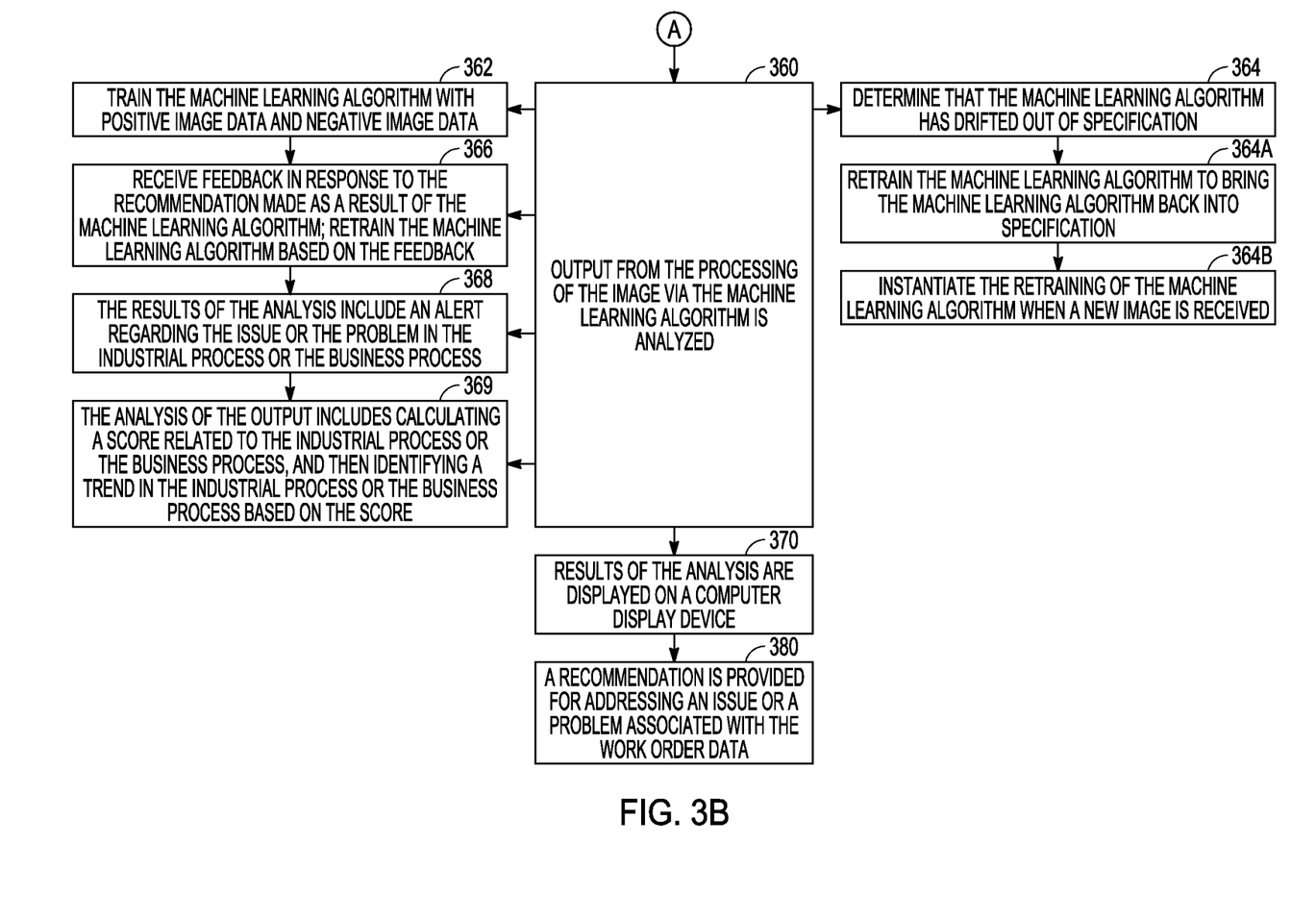

FIGS. 3A and 3B are a block diagram illustrating operations and features of an example system and method for processing, comparing, and analyzing image meta data, facility work order data, and facility quality data. FIGS. 3A and 3B include a number of process blocks 310-380. Though arranged substantially serially in the example of FIGS. 3A and 3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring specifically now to FIGS. 3A and 3B, at 310, an image relating to an industrial process or a business process is received into a computer processor and/or a computer memory. As indicated at 311, in an embodiment, the image can be received from an automated optical inspection (AOI) system. As further indicated at 311A, the AOI system can include one or more of a robotic arm and an image sensor coupled to the robotic arm, an x-ray device, a personal communication device, and other types of sensors. The AOI system captures optical or other sensed data on different types of parts, circuit boards, pieces of the different types of parts, and/or a whole product, for example. As previously noted, these data have not historically been linked to other systems or databases. Therefore, in an embodiment, these data are linked to other databases and/or systems, thereby creating a digital thread. The digital image links data relating to an image to a work order, quality data, scores, and trends. The data relating to the image, work order, and quality are kept in a database system, the machine learning generates the scores, and the scores can be analyzed to identify any trends. So while a situation may not currently be an issue, the identification of a trend may indicate that it could become an issue.

At 320, meta data are extracted from the image. At 330, work order data relating to the industrial process or the business process are received. At 340, the image is processed using one or more machine learning algorithms. As indicated at 342, the processing of the image via a machine learning algorithm identifies an anomaly in a part or a product associated with the industrial process or the business process. Such an anomaly can be identified in one or more ways. For example, the shape of the object could be different than that which is expected. As another example, there may be a difference in the intensity of a part of the image, which may indicate some type of damage or other defect. It should be noted that while a difference in intensity may indicate a defect, on the other hand it may not. The intensity difference may only indicate a non-defect difference. Consequently, a person may have to further inspect the object.

At 350, the image meta data are used to match the image with the work order data. At 360, output from the processing of the image via the machine learning algorithm is analyzed. Finally, at 370, results of the analysis are displayed on a computer display device, and at 380, a recommendation is provided for addressing an issue or a problem associated with the work order data that relate to the industrial process or the business process.

In another embodiment, quality data, in addition to the work order data, are received and processed. In an embodiment, these quality data are historical quality information. Specifically, at 312A, quality data relating to the industrial process or the business process are received, and at 312B, the work order data and the quality data are matched and merged. At 312C, the image meta data are used to match the image with the work order data and the quality data, and at 312D, the matched and merged work order data are used in connection with providing the recommendation for addressing the issue or problem associated with the work order data that relate to the industrial process or the business process. As indicated at 312AA, the image meta data, the work order data, and the quality data can include a part number, a serial number, a location, and a date. It is noted that there are data for both defective and non-defective images.

As indicated at 314, the image is stored in an image repository. At 314A, the digital thread relating to a serialized part in the industrial process or an object in the business process is created. This digital thread provides a link between the image repository and another system such as a database system including work orders, quality information, and other data. Such data can include all manufacturing data for parts and a system of records for such parts.

Referring back to the machine learning processing, at 362, the machine learning algorithm can be trained with positive image data and negative image data. For example, in a factory situation, non-defective parts used in the manufacturing process can be used as positive image data, and images of defective parts in the manufacturing process can be used as negative training data. At 364, it is determined that the machine learning algorithm has drifted out of specification, and at 364A, the machine learning algorithm is retrained to bring the machine learning algorithm back into specification. As indicated at 364B, this retraining of the machine learning algorithm can be instantiated automatically when a new image is received. In an embodiment, the new image can be tagged in order to identify it for retraining. At 366, feedback is received in response to the recommendation made as a result of the machine learning algorithm, and the machine learning algorithm is retrained based on the feedback. For example, the machine learning algorithm may have suggested a particular action be taken, but the implementation of that suggested action did not function well. That feedback is then used to retrain the machine learning algorithm and improve the machine learning algorithm so that that recommendation is not made again. This retraining results in a more intelligent model.

As indicated at 368, the results of the analysis can include an alert regarding the issue or the problem in the industrial process or the business process. At 369, the analysis of the output further includes calculating a score related to the industrial process or the business process, and then identifying a trend in the industrial process or the business process based on the score.

Returning back to the processing of the image via a machine learning algorithm, as previously mentioned and as specifically indicated at 344A, the image can be processed via a plurality of machine learning algorithms. Then, at 344B, a plurality of scores can be generated from the plurality of machine learning algorithms. A conglomerate score from the plurality of scores is calculated at 344C, and at 344D, the recommendation based on the conglomerate score is provided to an operator or other person. In an embodiment wherein there are a plurality of machine learning algorithms, there can be for example two supervised algorithms and one unsupervised algorithm. In such an embodiment, there further can exist an ensemble classifier, which receives the output from the plurality of algorithms, and assembles the output into a combined result.

While embodiments have been described that relate primarily to industrial processes and business processes, the embodiments of this disclosure could also be applied to other areas, such as medical processes. For example, the examination of chest x-rays of a Covid-19 or other patient could be automated, drift could be identified, models could be retrained, and trends could be identified using the one or more embodiments disclosed herein.

Figure 4:
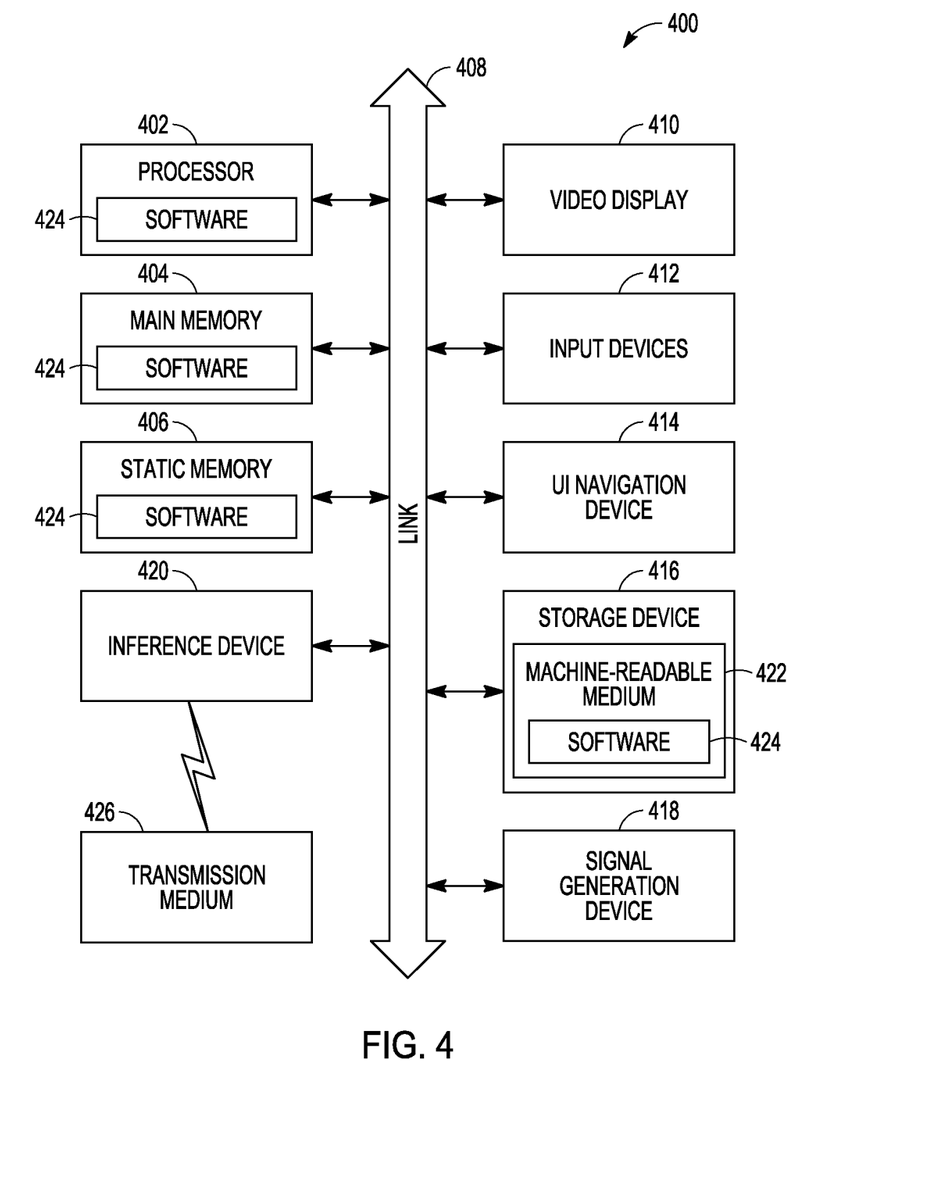
FIG. 4 is a block diagram of a computer system upon which one or more of the disclosed embodiments can execute.

FIG. 4 is a block diagram illustrating a computing and communications platform 400 in the example form of a general-purpose machine on which some or all the operations of FIGS. 3A and 3B may be carried out according to various embodiments. In certain embodiments, programming of the computing platform 400 according to one or more particular algorithms produces a special-purpose machine upon execution of that programming. In a networked deployment, the computing platform 400 may operate in the capacity of either a server or a client machine in server-client network environments, or it may act as a peer machine in peer-to-peer (or distributed) network environments.

Example computing platform 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computing platform 400 may further include a video display unit 410, input devices 412 (e.g., a keyboard, camera, microphone), and a user interface (UI) navigation device 414 (e.g., mouse, touchscreen). The computing platform 400 may additionally include a storage device 416 (e.g., a drive unit), a signal generation device 418 (e.g., a speaker), and an inference device 420 (such as a virtual inference device (a cloud web service) or a hardware edge device). Inference device 420 can receive wireless transmissions, such as RF emissions, over wireless transmission medium 426.

The storage device 416 includes a non-transitory machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computing platform 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:
    receiving an image relating to an industrial process or a business process;
    extracting meta data from the image;
    receiving work order data relating to the industrial process or business process;
    processing the image via a machine learning algorithm;
    using the image meta data to match the image with the work order data;
    analyzing output from the processing of the image via the machine learning algorithm;
    displaying results of the analysis on a computer display device;
    providing a recommendation for addressing an issue or a problem associated with the work order data relating to the industrial process or the business process;
    receiving quality data relating to the industrial process or the business process;
    matching and merging the work order data and the quality data;
    using the image meta data to match the image with the work order data and the quality data; and
    using the matched and merged work order data and the quality data in connection with providing the recommendation.

2. The process of claim 1, wherein the image meta data, the work order data, and the quality data comprise a part number, a serial number, a location, and a date.

3. The process of claim 1, wherein the image is received from an automated optical inspection (AOI) system.

4. The process of claim 3, wherein the AOI system comprises one or more of a robotic arm and an image sensor coupled to the robotic arm, an x-ray device, and a personal communication device.

5. The process of claim 1, comprising storing the image in an image repository.

6. The process of claim 5, comprising creating a digital thread relating to a part in the industrial process or an object in the business process; wherein the digital thread provides a link between the image repository and another system.

7. The process of claim 1, comprising training the machine learning algorithm with positive image data and negative image data.

8. The process of claim 1, comprising determining that the machine learning algorithm has drifted out of specification; and
    retraining the machine learning algorithm to bring the machine learning algorithm back into specification.

9. The process of claim 1, comprising automatically retraining the machine learning algorithm when a new image is received.

10. The process of claim 1, comprising receiving feedback in response to the recommendation; and retraining the machine learning algorithm based on the feedback.

11. The process of claim 1, wherein the results of the analysis comprise an alert regarding the issue or the problem in the industrial process or the business process.

12. The process of claim 1, wherein the analyzing the output comprises calculating a score related to the industrial process or the business process; and identifying a trend in the industrial process or the business process based on the score.

13. The process of claim 1, wherein the processing the image via a machine learning algorithm identifies an anomaly in a part, a product, or an object associated with the industrial process or the business process.

14. The process of claim 1, comprising processing the image via a plurality of machine learning algorithms; generating a plurality of scores from the plurality of machine learning algorithms; determining a conglomerate score from the plurality of scores; and providing the recommendation based on the conglomerate score.

15. A non-transitory computer-readable medium comprising instructions that when executed by a processor executes a process comprising:
   receiving an image relating to an industrial process or a business process;
   extracting meta data from the image;
   receiving work order data relating to the industrial process or business process;
   processing the image via a machine learning algorithm;
   using the image meta data to match the image with the work order data;
   analyzing output from the processing of the image via the machine learning algorithm;
   displaying results of the analysis on a computer display device;
   providing a recommendation for addressing an issue or a problem associated with the work order data relating to the industrial process or the business process; and
   processing the image via a plurality of machine learning algorithms; generating a plurality of scores from the plurality of machine learning algorithms; determining a conglomerate score from the plurality of scores; and providing the recommendation based on the conglomerate score.

16. The non-transitory computer-readable medium of claim 15, comprising instructions for:
   receiving quality data relating to the industrial process or the business process;
   matching and merging the work order data and the quality data;
   using the image meta data to match the image with the work order data and the quality data; and
   using the matched and merged work order data and the quality data in connection with providing the recommendation.

17. The non-transitory computer-readable medium of claim 15, comprising instructions for:
   storing the image in an image repository; and
   creating a digital thread relating to a part in the industrial process or an object in the business process; wherein the digital thread provides a link between the image repository and another system.

18. A system comprising:
   a computer processor; and
   a computer readable medium coupled to the computer processor;
   wherein the computer processor is operable for:
   receiving an image relating to an industrial process, a business process, or a medical process;
   extracting meta data from the image;
   receiving work order data relating to the industrial process or business process;
   processing the image via a machine learning algorithm;
   using the image meta data to match the image with the work order data;
   analyzing output from the processing of the image via the machine learning algorithm;
   displaying results of the analysis on a computer display device;
   providing a recommendation for addressing an issue or a problem associated with the work order data relating to the industrial process or the business process; and
   processing the image via a plurality of machine learning algorithms; generating a plurality of scores from the plurality of machine learning algorithms; determining a conglomerate score from the plurality of scores; and providing the recommendation based on the conglomerate score.

19. The system of claim 18, wherein the computer processor is operable for:
   receiving quality data relating to the industrial process or the business process;
   matching and merging the work order data and the quality data;
   using the image meta data to match the image with the work order data and the quality data; and
   using the matched and merged work order data and the quality data in connection with providing the recommendation.

* * * * *

UNITED STATES PATENT AND TRADEMARK OFFICE
CERTIFICATE OF CORRECTION

PATENT NO. : 11,741,686 B2
APPLICATION NO. : 17/108700
DATED : August 29, 2023
INVENTOR(S) : Gosinski et al.

It is certified that error appears in the above-identified patent and that said Letters Patent is hereby corrected as shown below:

In the Drawings

Sheet 1 of 5, Fig. 1, and on the title page, the illustrative print figure, reference numeral 130, Line 4, delete "RESPOSITORY" and insert --REPOSITORY-- therefor On sheet 2 of 5, Fig. 2, reference numeral 130, Line 16, delete "ALGORITH" and insert --ALGORITHM-- therefor On sheet 2 of 5, Fig. 2, reference numeral 130, Line 19, delete "COORINATE" and insert --COORDINATE-- therefor On sheet 2 of 5, Fig. 2, reference numeral 130, Line 20, delete "COORINATE" and insert --COORDINATE-- therefor In the Claims In Column 8, Line 40, in Claim 6, after "process;", insert a linebreak In Column 8, Line 54, in Claim 10, after "and", insert a linebreak In Column 8, Line 61, in Claim 12, after "and", insert a linebreak

In Column 9, Line 2, in Claim 14, after "algorithms;", insert a linebreak In Column 9, Line 4, in Claim 14, after "algorithms;", insert a linebreak In Column 9, Line 5, in Claim 14, after "and", insert a linebreak In Column 9, Line 27, in Claim 15, after "algorithms;", insert a linebreak Signed and Sealed this
Twenty-second Day of October, 2024

Katherine Kelly Vidal
*Director of the United States Patent and Trademark Office*

In Column 9, Line 28, in Claim 15, after "algorithms;", insert a linebreak

In Column 9, Line 29, in Claim 15, after "and", insert a linebreak

In Column 10, Line 5, in Claim 17, after "process;", insert a linebreak

In Column 10, Line 27, in Claim 18, after "algorithms;", insert a linebreak

In Column 10, Line 28, in Claim 18, after "algorithms;", insert a linebreak

In Column 10, Line 29, in Claim 18, after "and", insert a linebreak